Patented Sept. 11, 1934

1,972,956

UNITED STATES PATENT OFFICE 1,972,956

METHOD OF FORMING ALIPHATIC DERIVATIVES OF AROMATIC COMPOUNDS

George W. Seymour, Cumberland, Md., assignor to Celanese Corporation of America, a corporation of Delaware No Drawing. Application April 16, 1932,
Serial No. 605,797

8 Claims. (Cl. 260—154)

This invention relates to method of carrying out chemical reactions and relates more particularly to a new method of introducing aliphatic groups into an aromatic nucleus by the use of a novel condensing agent.

An object of my invention is to provide a new condensing agent for the promotion of the reaction of an aliphatic halide with an aromatic compound, particularly an aromatic compound containing a hydroxy group whereby the aliphatic group is introduced into the nucleus of the aromatic compound. A further object of my invention is to use hydrated ferric chloride as such condensing agent. Other objects of my invention will appear from the following detailed description.

A method commonly used for introducing alkyl groups into aromatic compounds to form aralkyl compounds has been by the use of the Friedel and Crafts reaction, wherein anhydrous aluminum chloride is used as a catalyst or condensing agent to cause an alkyl chloride to react with an aromatic hydrocarbon with the liberation of hydrogen chloride. In order to obtain proper reaction and good yields it was necessary not only to employ absolutely anhydrous aluminum chloride and anhydrous reagents, but also it was necessary to use freshly prepared or freshly sublimed aluminum chloride. This anhydrous aluminum chloride is relatively expensive and difficult to store because of its great reactivity towards the moisture in the air. Moreover, in the case of reaction with phenols, this Friedel and Crafts reaction gives very poor yields under normal working conditions.

I have made the surprising discovery that contrary to the known principles of the Friedel and Crafts reaction, hydrated ferric chloride may be employed as condensing agent or catalyst in processes involving the reaction of an aliphatic halide with an aromatic compound, particularly an aromatic compound containing hydroxy groups attached to the nucleus, whereby the halogen combines with a hydrogen of the aromatic nucleus to form a hydrogen halide, thus causing the group originally attached to the halogen to be substituted in the aromatic compound. This discovery is contrary to the previously held theory that for reactions of this type, both the condensing agent and the reactants should be anhydrous. The use of hydrated ferric chloride for this purpose is of great commercial importance, since hydrated ferric chloride is very inexpensive, presents no difficulty in storage, and in cases involving the reaction of a phenol better yields are obtained by its use than when anhydrous aluminum chloride is used as condensing agent.

In accordance with my invention I employ hydrated ferric chloride, that is, ferric chloride containing water of crystallization, as a catalyst or condensing agent for causing an aromatic compound to react with the halide of the aliphatic group to be introduced into the aromatic nucleus.

Any suitable aromatic compound may be employed as one of the reactants. Such aromatic compounds are preferably hydroxy nuclear substitution products of aromatic hydrocarbons such as benzene, toluene, xylene, naphthalene or their nuclear substitution products wherein the nuclear substituent group may be amino, chlorine or other halogen, COOH, etc. This invention is of particular interest in connection with the process wherein phenols, such as phenol itself $C_6H_5OH$, cresols, naphthols or other hydroxy derivatives of aromatic compounds are to be employed as the aromatic compound in the reaction. I have found that better yields and smoother reactions are obtained when hydrated ferric chloride is employed in reactions involving these phenols than when anhydrous aluminum chloride or other anhydrous catalysts are employed.

Any suitable aliphatic halide may be used to react with the aromatic compound. This aliphatic halide may be halogenated aliphatic hydrocarbons such as methyl, ethyl, propyl, butyl or amyl chloride, bromide or iodide. However, other halogen compounds such as vinyl chloride, methylene chloride, chloroform or acid chlorides, such as acetyl chloride, may be employed as reactants.

In order further to illustrate my invention but without being limited thereto, the following specific examples are given:

Example I 1 molecular proportion of phenol and one molecular proportion of tertiary butyl chloride and 0.2 molecular proportions of hydrated ferric chloride, $FeCl_3.6H_2O$, are heated under reflux at 80 to 90° C. for 20 to 24 hours. The reaction mixture is then poured into cold water whereupon a large quantity of dark colored crystals are formed. These crystals are thoroughly washed and then steam distilled, after which they may be recrystallized from acetic acid to form crystals of tertiary butyl phenol.

Example II

The process of Example I is carried out except that tertiary amyl chloride is substituted for the tertiary butyl chloride. In this manner tertiary amyl phenol is formed.

Example III 10 parts by weight of hydrated ferric chloride, $FeCl_3.6H_2O$ are added to 50 parts by weight of phenol. The mass is heated to 100° C. and vinyl chloride is run in a slow stream through the same while stirring. After 60 parts by weight of vinyl chloride have been introduced, the reaction is stopped. Water is then added to the mixture and the vinyl phenol precipitated out.

The foregoing detailed description is given by way of illustration only, and many variations may be made therein without departing from the spirit of my invention.

Having described my invention what I claim and desire to secure by Letters Patent is:

1. Method of forming aliphatic derivatives of aromatic compounds comprising causing an aromatic compound containing replaceable nuclear hydrogen to react with an aliphatic halide in the presence of hydrated ferric chloride as catalyst or condensing agent, whereby the aliphatic group is introduced into the nucleus of the aromatic compound.

2. Method of forming alkyl derivatives of aromatic compounds comprising causing an aromatic compound containing replaceable nuclear hydrogen to react with an alkyl halide in the presence of hydrated ferric chloride as catalyst or condensing agent, whereby the alkyl group is introduced into the nucleus of the aromatic compound.

3. Method of forming alkyl derivatives of aromatic compounds comprising causing an aromatic compound containing replaceable nuclear hydrogen to react with an alkyl chloride in the presence of hydrated ferric chloride as catalyst or condensing agent, whereby the alkyl group is introduced into the nucleus of the aromatic compound.

4. Method of forming aliphatic derivatives of phenol comprising causing a phenol to react with an aliphatic halide in the presence of hydrated ferric chloride as catalyst or condensing agent, whereby the aliphatic group is introduced into the nucleus of the phenol.

5. Method of forming alkyl derivatives of phenol comprising causing a phenol to react with an alkyl halide in the presence of hydrated ferric chloride as catalyst or condensing agent, whereby the alkyl group is introduced into the nucleus of the phenol.

6. Method of forming alkyl derivatives of phenol comprising causing a phenol to react with an alkyl chloride in the presence of hydrated ferric chloride as catalyst or condensing agent, whereby the alkyl group is introduced into the nucleus of the phenol.

7. Method of preparing butyl phenol comprising causing phenol to react with butyl chloride in the presence of hydrated ferric chloride as catalyst or condensing agent.

8. Method of preparing amyl phenol comprising causing phenol to react with amyl chloride in the presence of hydrated ferric chloride as catalyst or condensing agent.

GEORGE W. SEYMOUR.